No. 677,947. Patented July 9, 1901.
J. W. COWAN.
DENTAL FLOSS HOLDER.
(Application filed Jan. 5, 1901.)
(No Model.)
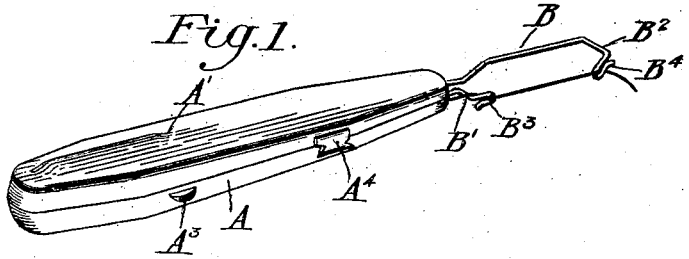
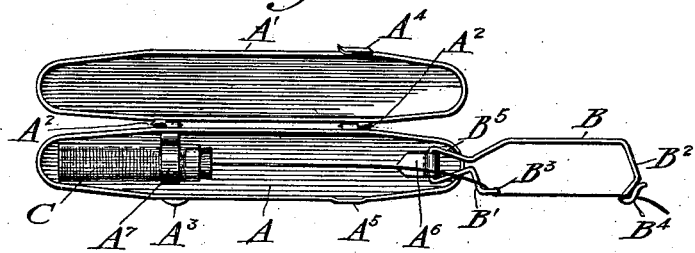
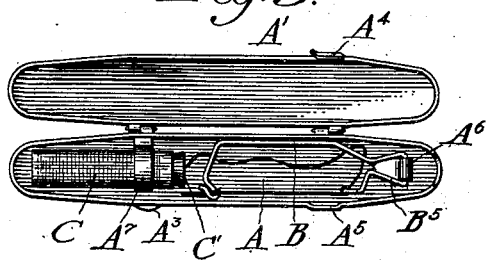
Witnesses:
O. W. Edelin.
Chas. J. O'Neill.
Inventor:
J. W. Cowan
By his attys.
Pennie & Goldsborough
THE NORRIS PETERS CO., PHOTO-LITHO., WASHINGTON, D. C.

UNITED STATES PATENT OFFICE.

JAMES WATSON COWAN, OF GENESEO, NEW YORK.

DENTAL-FLOSS HOLDER.

SPECIFICATION forming part of Letters Patent No. 677,947, dated July 9, 1901.

Application filed January 5, 1901. Serial No. 42,230. (No model.)

*To all whom it may concern:*

Be it known that I, JAMES WATSON COWAN, a citizen of the United States, residing at Geneseo, county of Livingston, State of New York, have invented certain new and useful Improvements in Dental-Floss Holders; and I do hereby declare the following to be a full, clear, and exact description of the invention, such as will enable others skilled in the art to make and use the same.

My invention relates to certain improvements in dental-floss holders.

In Patent No. 664,126, granted to me December 18, 1900, is disclosed a dental appliance which consists of a casing in which is mounted a spool or bobbin of dental floss, and the casing has pivoted thereto a frame which can be folded back into the holder when not in use and is provided with means for holding a portion of the floss taut between the arms of the frame.

My present invention has for its object to produce an improved appliance generally similar to the one disclosed in the said patent, but in which a cop of floss unwinding from the center is employed instead of the rotating spool before referred to.

With this and other objects in view my invention consists in certain parts, improvements, and combinations, as will be hereinafter described, and more fully pointed out in the claims hereunto appended.

Referring to the drawings, which constitute a part of this specification, and in which like letters of reference indicate the same parts, Figure 1 is a perspective view of the improved dental appliance ready for use. Fig. 2 is a plan view thereof with the cover open, and Fig. 3 is a similar view with the frame folded back into the casing.

Referring to the drawings, A indicates a casing which may be made of any suitable material, but which is preferably made of sheet metal. In the preferred form of the construction the casing has hinged thereto a cover A', which may be secured in locked relation to the body of the casing by means of a catch $A^4$ engaging a lug $A^5$ on the body of the casing.

The appliance is provided with a frame, across which successive lengths of floss may be stretched and to which said lengths may be secured. This frame is indicated at B, and in the preferred form of the construction will be a spring-frame. As shown, the frame has two laterally-disposed spring-arms B' and $B^2$, which terminate in hooks $B^3$ and $B^4$, said frame being preferably pivotally secured to the casing in any suitable manner, as by means of a clip $A^6$.

The cop or ball of floss employed is wound in such a manner that it will unwind from the center and the cop is preferably contained within a tubular receptacle C, which may be of any suitable material, but is preferably of glass. This receptacle C is closed by means of a suitable stopper—as, for instance, a cork—and this cork is nicked or perforated to permit the floss to be drawn out through it. This receptacle is adapted to contain a suitable antiseptic, which may be in the form of a solution and which will keep the floss in proper condition for use.

The cop will be arranged in the casing in such a manner that it may be replaced by a fresh one when it is exhausted, and means will be provided which will hold the cop fixedly in the casing, so that it will not be displaced when the floss is drawn from it. The means by which the cop is maintained in the casing may be of any suitable construction. As shown, however, these means consist of a suitable clip $A^7$, which will preferably be a spring-clip and which holds the receptacle containing the cop firmly in position in the casing, and yet permits its removal when the floss in the cop is exhausted.

In assembling the device for use the receptacle containing the cop of floss and preferably an antiseptic solution is slipped under the clip $A^7$, which grips the same and holds it firmly in the casing. The end of the floss is drawn through the cork, the perforation in the same being preferably of a size so that a slight tension will be exerted on the floss, and the floss is then stretched in the frame between the hooks $B^3$ and $B^4$ to provide a taut section to be engaged in the interdental spaces in the ordinary manner. At the time when the length of floss is secured in the frame the frame is projected from the casing, and the cover is preferably closed, so that the frame is held in position by the same, a small opening being provided in the casing in which the frame rests. Successive lengths of floss are drawn out and secured in the frame as desired, and the portions which have been used are severed by means of a cutting edge on the catch A⁴.

Although the casing is shown and described as having a hinged cover, the invention is not to be confined to such a casing, as the construction of the same may be varied. While, furthermore, the construction which has been described is an effective one for the purpose, changes and variations may be made therein without departing from the invention. The invention is not, therefore, to be limited to the specific construction which has been hereinbefore described.

What is claimed is—

1. In a dental appliance, the combination with a case or holder of a cop of dental floss mounted therein, said cop unwinding from the center outward, means for detachably retaining said cop in fixed position in the casing, and a frame provided with means for maintaining stretched lengths of floss thereon, said frame being constructed to be contained within the holder when the appliance is not in use.

2. In a dental appliance, the combination with a casing, of a hollow closed receptacle mounted therein, said receptacle being adapted to contain an antiseptic, means for detachably retaining said receptacle in fixed position in the casing, a cop of dental floss contained in the receptacle, said cop being adapted to unwind from the center through the end of the receptacle, and a frame connected to the casing at one end.

3. In a dental appliance, the combination with a casing, of a hollow closed receptacle mounted therein, said receptacle being adapted to contain an antiseptic, means for detachably retaining said receptacle in fixed position in the casing, a cop of dental floss contained in the receptacle, said cop being adapted to unwind from the center through a tension-orifice in the end of the receptacle, a frame connected to the casing on which lengths of floss are adapted to be stretched when unwound from the cop, said frame being constructed to be contained within the casing when the appliance is not in use.

In testimony whereof I affix my signature in presence of two witnesses.

JAMES WATSON COWAN.

Witnesses:
FRANCES ELIZABETH DOTY,
FREDERICK V. DOTY.